United States Patent
Lowry et al.

(10) Patent No.: US 11,738,854 B2
(45) Date of Patent: Aug. 29, 2023

(54) FAIRING FOR FOLDING WING TIP

(71) Applicant: AIRBUS OPERATIONS LIMITED, Bristol (GB)

(72) Inventors: Richard Lowry, Bristol (GB); Neil John Lyons, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 175 days.

(21) Appl. No.: 17/296,205

(22) PCT Filed: Dec. 2, 2019

(86) PCT No.: PCT/GB2019/053398
§ 371 (c)(1),
(2) Date: May 21, 2021

(87) PCT Pub. No.: WO2020/157445
PCT Pub. Date: Aug. 6, 2020

(65) Prior Publication Data
US 2022/0017206 A1    Jan. 20, 2022

(30) Foreign Application Priority Data
Jan. 30, 2019    (GB) ..................... 1901266

(51) Int. Cl.
*B64C 7/00*    (2006.01)
*B64C 23/06*    (2006.01)
(Continued)

(52) U.S. Cl.
CPC ............ *B64C 7/00* (2013.01); *B64C 3/546* (2013.01); *B64C 21/08* (2013.01); *B64C 23/072* (2017.05)

(58) Field of Classification Search
CPC ......... B64C 7/00; B64C 23/072; B64C 3/546; B64C 21/08; B64C 3/56; B64U 20/50
See application file for complete search history.

(56) References Cited

U.S. PATENT DOCUMENTS 2,925,233 A    2/1960    Dunn et al.
4,247,063 A    1/1981    Jenkins
(Continued)

FOREIGN PATENT DOCUMENTS

CN    105438443    3/2016
CN    106184711    12/2016
(Continued)

OTHER PUBLICATIONS

Combined Search and Examination Report for GB Application No. 1901266.5 dated Jul. 4, 2019, 9 pages.
(Continued)

*Primary Examiner* — Rodney A Bonnette
(74) *Attorney, Agent, or Firm* — Nixon & Vanderhye P.C.

(57) ABSTRACT

An aircraft with wing tip devices, for example, folding wing tips, is disclosed. The folding wing tip may have a flight configuration for use during flight, and a ground configuration for use in ground-based operations. The ground configuration creates a shorter wing span than when the aircraft is in the flight configuration. A hinge arrangement protrudes beyond an outer surface of the fixed wing and wing tip device. In order to reduce the aerodynamic effect of the protruding hinge a fairing may be provided. In the flight configuration the fairing comprises a rear portion with a concave surface, such that the fairing acts as a lift-generating surface when the aircraft is in flight.

22 Claims, 7 Drawing Sheets

(51) Int. Cl.
    *B64C 3/54*     (2006.01)
    *B64C 21/08*    (2023.01)

(56) References Cited

U.S. PATENT DOCUMENTS

| | | | |
|---|---|---|---|
| 5,427,329 A * | 6/1995 | Renzelmann | B64C 3/56 |
| | | | 292/144 |
| 6,378,804 B1 | 4/2002 | Cambon | |
| 9,027,883 B2 * | 5/2015 | Lyons | B64C 7/00 |
| | | | 244/119 |
| 10,259,566 B1 * | 4/2019 | Lawrence | B64C 9/24 |
| 2001/0028019 A1 | 10/2001 | Cambon | |
| 2015/0298793 A1 * | 10/2015 | Fox | B64C 3/56 |
| | | | 244/49 |
| 2016/0368594 A1 * | 12/2016 | Cazals | B64C 3/38 |
| 2018/0057159 A1 | 3/2018 | Ivans et al. | |
| 2020/0407039 A1 * | 12/2020 | Sanders | B64C 7/00 |
| 2022/0009619 A1 * | 1/2022 | Lowry | B64C 7/00 |

FOREIGN PATENT DOCUMENTS

| | | |
|---|---|---|
| FR | 1320450 | 3/1963 |
| GB | 2 238 991 | 6/1991 |
| GB | 2567899 | 5/2019 |
| WO | 01/15972 | 3/2001 |

OTHER PUBLICATIONS

International Search Report and Written Opinion of the ISA for PCT/GB2019/053398 dated Apr. 15, 2020, 16 pages.

\* cited by examiner

FAIRING FOR FOLDING WING TIP

CROSS REFERENCE TO RELATED APPLICATIONS

The present application is a National Phase of International Application Number PCT/GB2019/053398 filed Dec. 2, 2019, which designated the U.S. and claims priority benefits from Great Britain Application Number GB 1901266.5 filed Jan. 30, 2019, the entire contents of each of which are hereby incorporated by reference.

BACKGROUND OF THE INVENTION

There is a trend towards increasingly large passenger aircraft, for which it is desirable to have correspondingly large wing spans. However, the maximum aircraft span is effectively limited by airport operating rules which govern various clearances required when manoeuvring around the airport (such as the span and/or ground clearance required for gate entry and safe taxiway usage).

Therefore, folding wing tip devices have been introduced into passenger aircraft, where a wing tip device is movable between a flight configuration for use during flight, and a ground configuration for use during ground-based operations. In the ground configuration, the wing tip device is moved away from the flight configuration such that the span of the aircraft wing is reduced, thereby allowing use of existing gates and safe taxiway usage.

The folding wing tip device may be connected to a fixed wing via a hinge arrangement. The hinge arrangement may protrude beyond the wing skin of the fixed wing and wing tip device, resulting in a need for a fairing to cover the exposed section of the hinge arrangement in order that the aerodynamic performance of the wing is not adversely affected. Various shapes of fairings are already known on an aircraft, for example blister fairings or flap track fairings. However, locating already-known shapes of fairing at the junction between the folding wing tip device and fixed wing have been found to result in an undesirable degree of lift loss and/or additional drag, when compared to a non-folding wing of the same span.

The present invention seeks to mitigate the above-mentioned problems. Alternatively or additionally, the present invention seeks to provide an improved fairing to reduce or eliminate the impact on lift loss at a junction between a fixed wing and wing tip device.

SUMMARY OF THE INVENTION

The present invention provides an aircraft comprising an aircraft wing, the aircraft wing comprising a fixed wing and a wing tip device at the tip thereof, wherein the wing tip device is configurable between: (i) a flight configuration for use during flight and (ii) a ground configuration for use during ground-based operations, in which ground configuration the wing tip device is moved away from the flight configuration such that the span of the aircraft wing is reduced, the aircraft wing further comprising a hinge arrangement connecting the fixed wing and the wing tip device, wherein the hinge arrangement protrudes beyond an outer surface of the fixed wing and wing tip device, and a fairing covering the protruding portion of the hinge, wherein in the flight configuration the fairing comprises a rear portion with a concave surface, the surface creating a lift-generating portion of the fairing during flight.

Shaping the fairing such that a portion acts as a lift-generating portion during flight may eliminate or reduce the lift loss typically associated with the placement of a fairing on an aircraft wing.

The rear portion may comprise a trailing edge with a width in the span-wise direction. The rear portion may extend beyond the trailing edge of the fixed wing and wing tip device. The rear portion of the fairing may comprise a trailing edge which is parallel to the trailing edge of the fixed wing and/or wing tip device. The rear portion may taper in span-wise width as it extends away from the trailing edge of the fixed wing and wing tip device.

The rear portion may comprise a point of inflection in the line of flight direction, at which point the cross-sectional profile of the rear portion in the line of flight direction changes from a convex profile to a concave profile, as the rear portion extends in a rearward direction. The point of inflection may be located in a region around 100%, 90%, 80%, 70%, or 60% of the chord length of the wing, taken in a line of flight direction and moving from the leading edge (0%) to trailing edge (100%) of the wing. The line of flight direction is taken along the longitudinal axis of the aircraft. The span-wise direction is taken to be perpendicular to the line of flight direction.

The aircraft may be arranged such that as the fairing extends in a span-wise direction, the rear portion of the fairing comprises a surface which extends substantially tangentially from the wing skin of the fixed wing in a concave direction, undergoes a point of inflection to extend in a convex direction, and undergoes a further point of inflection such that it extends in a concave direction to a point where it is substantially tangential to the wing skin of the wing tip device. This bell-shaped cross-section may reduce in depth as the rear portion extends rearwardly, such that at the trailing edge of the fairing, the bell-shaped cross-section is much reduced or eliminated (i.e. flat) in a span-wise direction. As previously, such definitions are when the wing tip device is in the flight configuration. The aircraft may comprise one or more seals where the fairing meets the fixed wing and/or the wing tip device.

The fairing may comprise a front portion blended into and extending rearwardly from the leading edge of the fixed wing and the wing tip device when the wing tip device is in the flight configuration.

Provision of a fairing with a front portion blended into the leading edge of the fixed wing and wing tip device may reduce or eliminate the lift loss experienced by an aircraft wing where the fixed wing and wing tip device meet. As such, the aerodynamic performance of the wing may be improved.

The blending of the fairing into the leading edge of the fixed wing and wing tip device means that there are no discontinuities between the fairing and the leading edge of the fixed wing and wing tip device. This blending is in all directions, so tracing a line across the fairing and the leading edge of the fixed wing and wing tip device in a span-wise direction, a smooth transition is provided. Equally, tracing a line backwards from the leading edge of the fixed wing and wing tip device in a line of flight direction, a smooth transition is provided. The front portion of the fairing may be considered as aerodynamically seamless where it blends with the leading edge of the wing, such that the shape of the fairing results in no separation or stagnation points being created by the front portion of the fairing when the aircraft is in flight. There may be a line of continuous curvature extending from the front portion of the fairing around the leading edge of the wing. The line of continuous curvature may extend around the fairing and the wing in a line-of-flight direction. There may be a multiplicity of lines of continuous curvature, spaced across the width of the fairing, and each extending from the front portion of the fairing around the leading edge of the wing.

The fairing may be shaped such that the depth of the fairing is greatest to correspond with the maximum protrusion of the hinge arrangement. In order to provide a smooth transition between the fairing and the fixed wing and wing tip device in a span-wise direction, the fairing may comprise a concave surface from the wing skin of the fixed wing, the concave surface starting in a direction tangential to the wing skin. The fairing may further comprise a point of inflection in a span-wise direction, at which point the surface becomes a convex surface. The convex surface may peak to correspond to the maximum protrusion of the hinge arrangement. The fairing may further comprise an additional point of inflection, at which point the surface becomes a concave surface, such that the concave surface meets the wing tip device wing skin in a tangential direction. This applies when the wing tip device is in the flight configuration, not necessarily when the wing tip device is in the ground configuration. An alternative way of describing the span-wise cross-sectional profile of the front portion is that is traces a bell-shaped profile. At the very leading edge of the front portion, the bell-shaped profile may be very small, or non-existent (i.e. flat) because the fairing blends with the leading edge of the wing, but as the front portion extends rearwardly from the leading edge, the depth of the bell-shaped profile may increase. The aircraft may comprise one or more seals where the fairing meets the fixed wing and/or the wing tip device.

The fairing may be substantially symmetrical about an axial plane running along the line of flight direction and normal to the wing dihedral, the axis located at the point of greatest depth of the fairing. The fairing may be symmetrical about such a line of flight axis along at least 70%, 80% or 90% of the axis. If the wing is a swept wing, the very front of the front portion of the fairing may deviate from symmetry due to the angle created between the leading edge of the fixed wing and wing tip device and the axis. If the wing is a swept wing, a rear portion of the fairing may deviate from symmetry due to the angle created by the trailing edge of the fairing and the axis.

The edges of the fairing, where the fairing blends into the fixed wing or wing tip device may extend in a line of flight direction. As such, the fairing may have a consistent width in a span-wise direction. Such an arrangement may reduce lift loss.

The front portion of the fairing may meet the leading edge of the fixed wing and wing tip device in a tangential direction, such that when viewed in a line of flight cross-section, there is no discontinuity between the fairing, the leading edge of the fixed wing and wing tip device.

The hinge arrangement may extend in a line of flight direction. The hinge arrangement may extend in a line of flight direction such that it extends over at least 60%, at least 70%, at least 80%, or at least 90% of the chord of the aircraft wing in a line of flight direction (i.e. between the leading edge of the wing and the trailing edge of the wing in a line of flight direction). As a result, the hinge arrangement may protrude from at or near the leading edge of the fixed wing and wing tip device. The present invention provides a fairing which enables the hinge arrangement in such an aircraft wing to be covered without it being necessary to extend the fairing beyond the leading edge of the aircraft wing. Such an arrangement may be advantageous aerodynamically.

The fairing may be located on the lower surface of the aircraft wing. The lower surface of the aircraft wing is defined as the surface of the wing which faces the ground when the aircraft is on the ground. In an alternative arrangement, the fairing may be located on the upper surface of the wing. The determination of the surface with which to associate the fairing may depend on the surface from which the hinge arrangement protrudes.

According to a second aspect, the invention provides an aircraft wing comprising a fixed wing and a wing tip device at the tip thereof, wherein the wing tip device is configurable between: (i) a flight configuration for use during flight and (ii) a ground configuration for use during ground-based operations, in which ground configuration the wing tip device is moved away from the flight configuration such that the span of the aircraft wing is reduced, the aircraft wing further comprising a hinge arrangement connecting the fixed wing and the wing tip device, wherein the hinge arrangement protrudes beyond an outer surface of the fixed wing and wing tip device, and a fairing covering the protruding portion of the hinge, wherein in the flight configuration the fairing comprises a rear portion, with a concave surface, the surface creating a lift-generating portion of the fairing during flight.

According to a third aspect of the invention, there is provided an aircraft comprising an aerodynamic structure and a fairing, wherein the fairing is blended into the aerodynamic structure in a line of flight direction and a span-wise direction, such that there are no discontinuities in the transition from the aerodynamic structure and the fairing. The fairing may comprise a point of inflection in a line of flight direction. Such a point of inflection may improve the aerodynamic performance of the fairing. The fairing may comprise an under camber. The fairing may add to the lift created by the aerodynamic structure.

According to a fourth aspect, the invention provides a fairing for an aircraft, the fairing comprising an interface surface for interfacing with the aircraft in a tangential direction, and an aerodynamic surface, the fairing further comprising a seamless transition from the interface surface to the aerodynamic surface.

The fairing may comprise a longitudinal axis corresponding to the line of flight direction when mounted on an aircraft, wherein the cross-sectional profile of the fairing taken perpendicular to the longitudinal axis comprises a bell-shaped curve. The aerodynamic surface may comprise a concave surface, for example, an under camber.

In embodiments of the present invention, the wing tip device is configurable between: (a) a flight configuration for use during flight and (b) a ground configuration for use during ground-based operations, in which ground configuration the wing tip device is moved away from the flight configuration such that the span of the aircraft wing is reduced. In the flight configuration, the span may exceed an airport compatibility limit. In the ground configuration the span may be reduced such that the span (with the wing tip device in the ground configuration) is less than, or substantially equal to, the airport compatibility limit. The airport compatibility limit is a span limit (for example relating to clearance restrictions for buildings, signs, other aircraft). The compatibility limit is preferably a gate limit.

The wing tip device may be a wing tip extension; for example the wing tip device may be a planar tip extension. In other embodiments, the wing tip device may comprise, or consist of, a non-planar device, such as a winglet.

In the flight configuration the trailing edge of the wing tip device is preferably a continuation of the trailing edge of the fixed wing. The leading edge of the wing tip device is preferably a continuation of the leading edge of the fixed wing. There is preferably a smooth transition from the fixed wing to the wing tip device. It will be appreciated that there may be a smooth transition, even where there are changes in sweep or twist at the junction between the fixed wing and wing tip device. However, there are preferably no discontinuities at the junction between the fixed wing and wing tip device. The upper and the lower surfaces of the wing tip device may be continuations of the upper and lower surfaces of the fixed wing. The span ratio of the fixed wing relative to the wing tip device may be such that the fixed wing comprises at least 70%, 80%, 90%, or more, of the overall span of the aircraft wing.

When the wing tip device is in the ground configuration, the aircraft incorporating the wing, may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

It will of course be appreciated that features described in relation to one aspect of the present invention may be incorporated into other aspects of the present invention. For example, the method of the invention may incorporate any of the features described with reference to the apparatus of the invention and vice versa.

The term 'or' shall be interpreted as 'and/or' unless the context requires otherwise.

DESCRIPTION OF THE DRAWINGS

Embodiments of the present invention will now be described by way of example only with reference to the accompanying schematic drawings of which.

DETAILED DESCRIPTION

Figure 1:
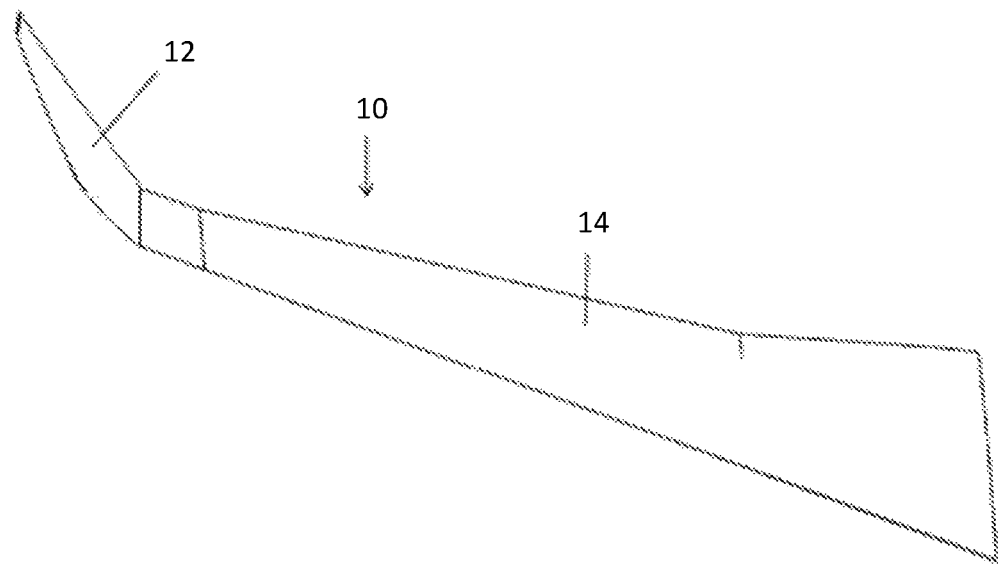
FIG. 1 shows an aircraft wing comprising a wing tip device and fixed wing according to an embodiment of the invention.
Figure 2:
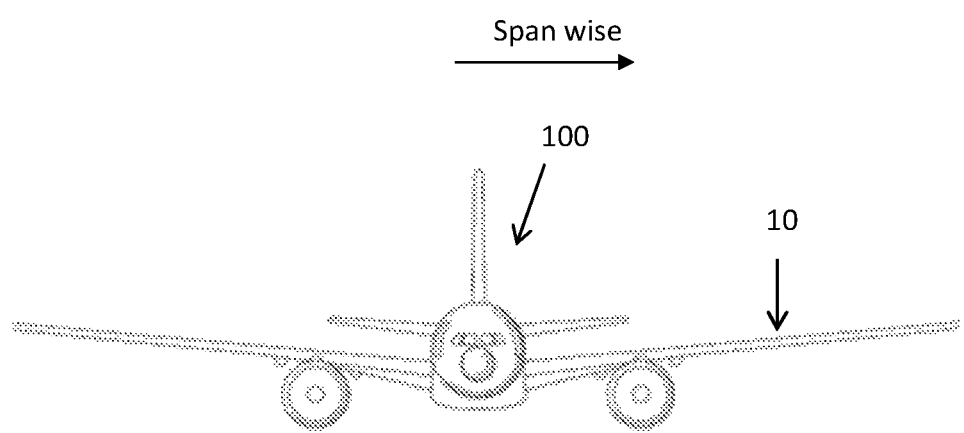
FIG. 2 shows an aircraft comprising an aircraft wing as shown in FIG. 1.

FIG. 1 shows an aircraft wing 10 comprising a wing tip device 12 and a fixed wing 14. In FIG. 1 the wing tip device 12 is in a ground configuration in which the span of the aircraft wing 10 is reduced compared to a flight configuration. FIG. 2 shows the aircraft wing 10 of FIG. 1 as part of an aircraft 100. In FIG. 2, the aircraft wing 100 is in the flight configuration, where the wing tip device 12 has been extended from the ground configuration shown in FIG. 1.

Figure 3:
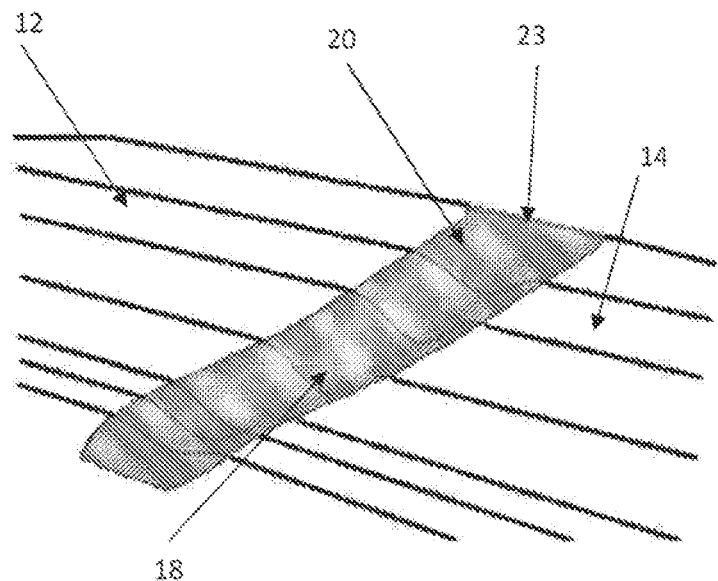
FIG. 3 is a schematic view of a fairing on the underside of an aircraft wing according to an embodiment of the invention
Figure 4:
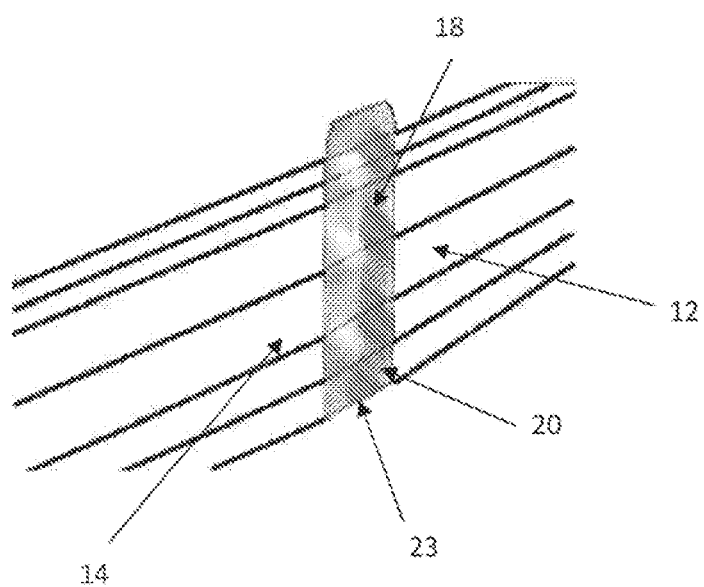
FIG. 4 is a plan view of the underside of the embodiment shown in FIG. 3.

FIGS. 3 and 4 show an enlarged schematic view of the wing tip device 12, fixed wing 14, and a fairing 18 which extends from the wing tip device 12 to the fixed wing 14 when the aircraft is in the flight configuration.

Figure 6:
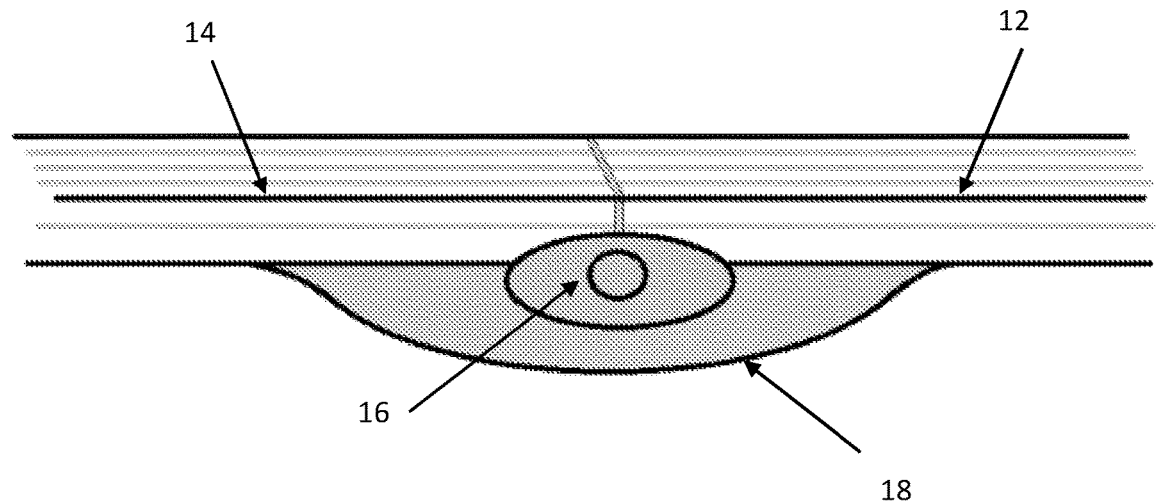
FIG. 6 is a schematic view of a slice of the wing of FIG. 3 taken in a span-wise direction

FIG. 6 shows a cross-sectional slice of a middle section of the wing 10 in a span-wise direction. The wing tip device 12 is connected to the fixed wing 14 via a hinge arrangement 16. The hinge arrangement 16 extends from a position at or close to the leading edge of the wing 10 to a position at or close to the trailing edge of the wing 10. Various different hinge arrangements may be suitable, and the protruding structure may take a number of forms depending on the design of the hinge arrangement. For example the hinge may include lugs, locking mechanisms, and/or actuation mechanisms, at least part of which may protrude from the wing outer mould line (OML). In most cases it is expected that at least part of the hinge arrangement for a folding wing tip would protrude from the OML at a location relatively far forward on the wing (i.e. relatively close to the leading edge). The hinge arrangement 16 allows the folding upwards, along a hinge line 22, of the wing tip device 12 from the flight configuration shown in FIG. 2 to the ground configuration shown in FIG. 1. The folding of the wing tip device between the flight configuration and ground configuration is controlled by an actuator (not shown) which may form part of the hinge arrangement 16. The skilled person will appreciate that various different actuators and actuation methods may be used, and no further details are required. The hinge arrangement 16 may also comprise a locking mechanism arranged to lock the folding wing tip device into the flight configuration. Various different locking mechanism may be suitable, as would be understood by a skilled person. As such, no further details will be provided. As can be seen, the hinge arrangement 16 extends outside the wing skin envelope of the fixed wing 14 and the folding wing tip 12, in particular extending from the underside of the wing 10.

Figure 5:
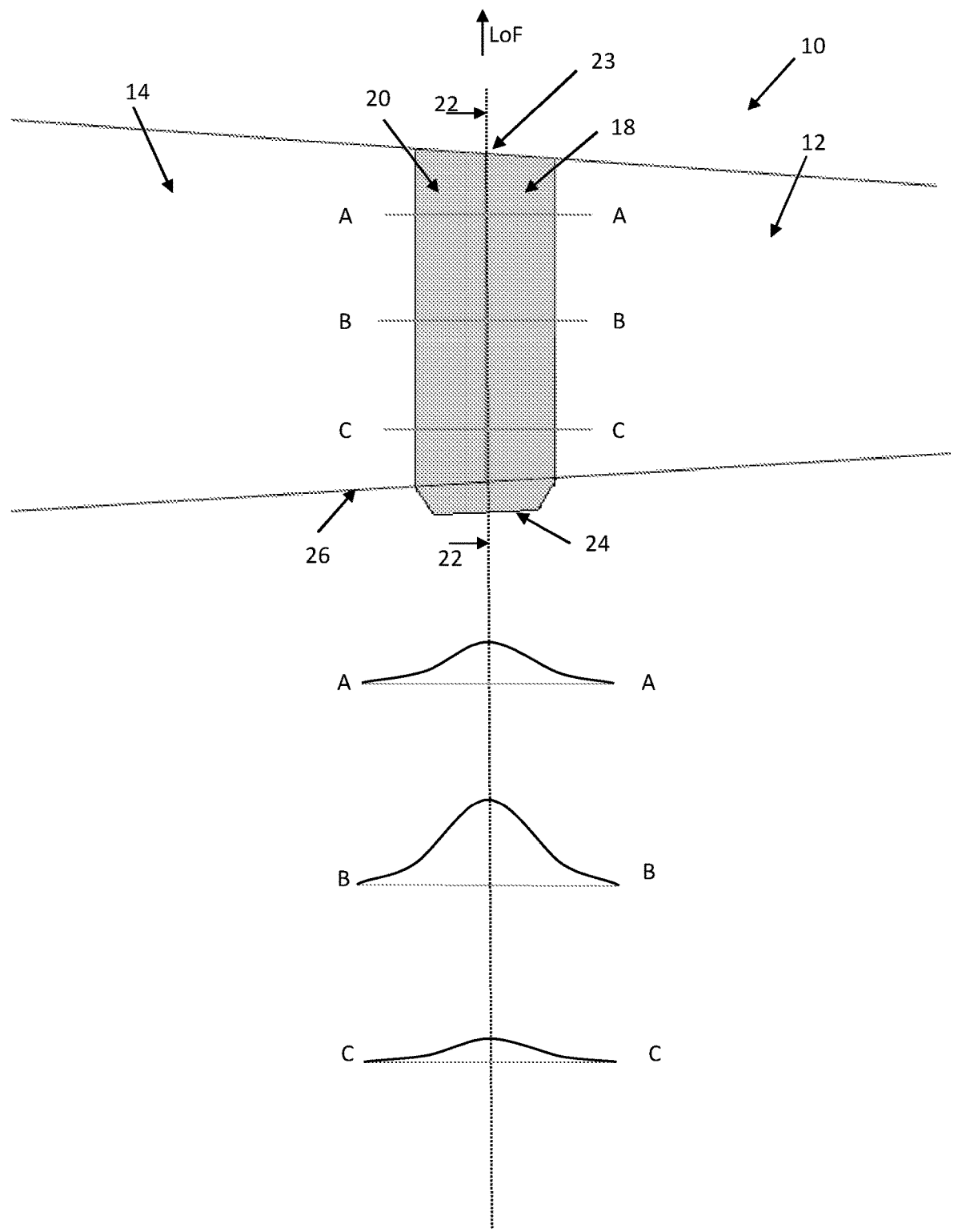
FIG. 5 is a view of the underside of an aircraft wing and fairing, similar to FIG. 4, along with some span-wise cross-sectional profiles of the fairing.
Figure 7:
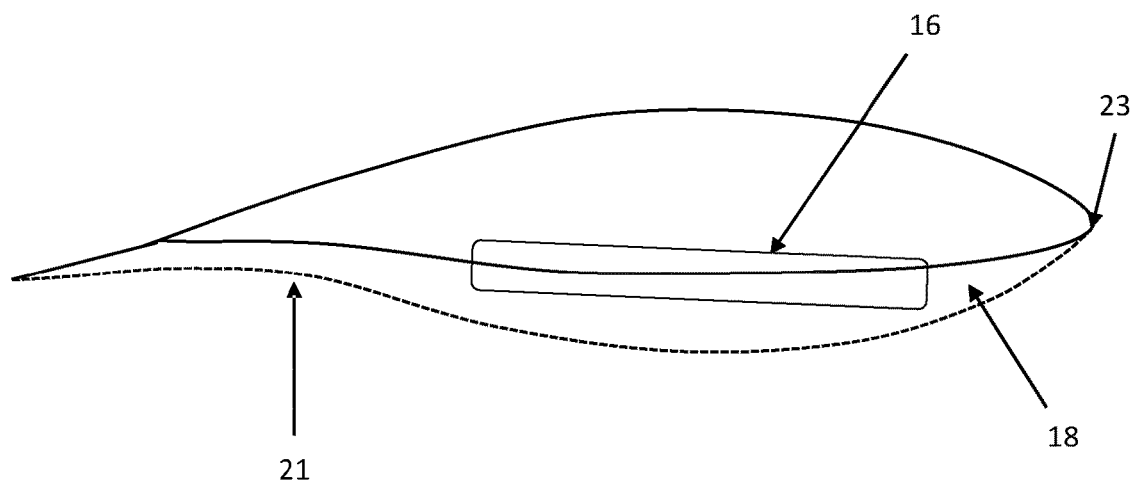
FIG. 7 is a cross-sectional view in a line of flight direction of the aircraft wing and fairing shown in FIG. 3.

FIG. 7 shows an second cross-sectional view of the arrangement of FIG. 6, the cross-sectional view taken in the line of flight direction and through the hinge line 22. The outer surface of the fairing 18 is represented by a dashed line, which extends beyond the lower wing skin of the fixed wing 14 and wing tip device 12 to cover the hinge 16. Further details about the shape of the fairing are provided below FIG. 5 shows the underside of the wing 10 and fairing 18 which covers the hinge arrangement 16. The fairing 18 comprises a front portion 20 which is blended into and extends rearwardly from the leading edge 23 of the fixed wing 14 and wing tip device 12. In this embodiment, the hinge arrangement 16 comprises a hinge line 22 which is aligned with the line of flight direction. The fairing 18 is also aligned with the line of flight direction and approximately symmetrical about the hinge axis 22. The span-wise edges of the fairing also extend in a line of flight direction, such that the span-wise width of the fairing is consistent. Providing parallel, line of flight oriented, edges to the fairing 16 acts to maintain lift due to the existence of the fairing, giving a continuity of span loading.

The blending of the front portion 20 of the fairing 18 into the leading edge 23 of the fixed wing 14 and folding wing tip device 12 means that, when looking a cross section of the wing profile in the line of flight direction (as in FIG. 7), there are no discontinuities or abrupt edges as the profile is traced from the leading edge 23 towards the trailing edge of the wing 10. As shown in FIG. 7, a line traced from the upper surface of the wing 10, around the leading edge 23, and rearwards along the front portion of the fairing has a continuous curvature. Whilst the depth of the fairing will vary across the width of the fairing, the continuous curvature in the line of flight direction remains, thereby across the whole width of the fairing and wing an effective aerofoil profile is provided at the leading edge 23 of the wing 10. This can be seen clearly in FIGS. 3 and 7. A continuous curvature is also provided when considering the lateral (i.e. span-wise) extension of the fairing 18 from the fixed wing 14 to the folding wing tip device 12. There are no discontinuities or abrupt edges as the fairing extends in a span-wise direction at the leading edge 23 of the wing 10. This smoothness continues as the fairing 18 extends away from the leading edge of the wing 10 towards the trailing edge of the wing 10. The cross sectional shape traced by the fairing 18 in the span-wise direction is bell shaped, so the fairing 18 initially extends from the wing skin of the fixed wing 14 in a concave manner, undergoes a point of inflection and extends in a convex manner as it extends around the hinge arrangement 16, undergoes a further point of inflection and extends in a concave manner to the wing skin of the folded wing tip device 12. At the point where the fairing 18 meets the wing skin of the fixed wing 14 and folding wing tip device 12, the fairing 18 extends substantially tangentially to the wing skin. This profile change can be seen in FIG. 5, where cross-sections of the fairing taken along the lines A-A, B-B, and C-C, are indicated. The bell shaped curve increases in depth from A-A to B-B and then decreases in depth from B-B to C-C. The increase and decrease in depth is done gradually, so no discontinuities exist on the exterior surface of the fairing 18. Whilst not shown in the figures, the skilled person will appreciate that seals may be provided at the interface between the wing skin and the fairing, particularly at the interface between the wing skin of the wing tip device and the fairing.

Figure 10:
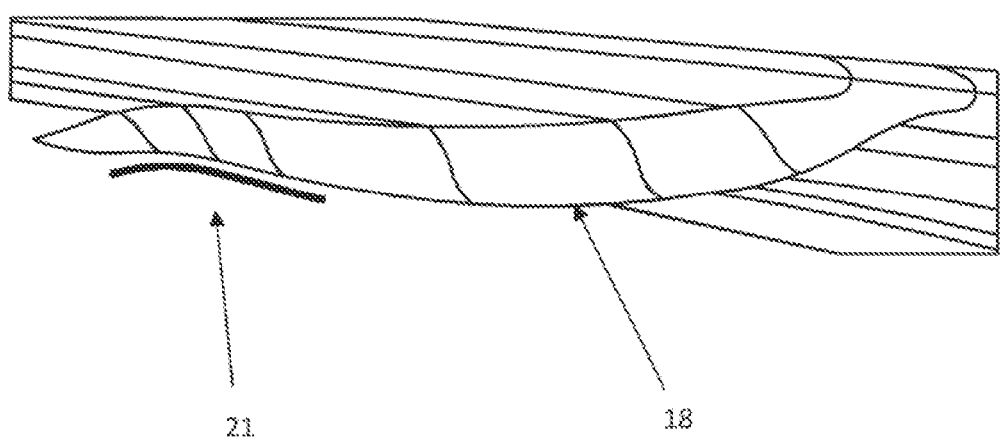
FIG. 10 is a schematic view of the wing as shown in FIG. 3, with a point of inflection clearly indicated.

As shown in FIG. 5, the fairing 18 also comprises a rear portion 24, which extends beyond the trailing edge of the fixed wing 14 and folding wing tip device 12 in a rearward direction. The rear portion 24 tapers in width as it extends beyond the trailing edge of the fixed wing 14 and folding wing tip device 12. As shown in FIG. 5, the rear portion 24 comprises a trailing edge 26, which is approximately aligned with the trailing edge of the fixed wing 14 and folding wing tip device 12. When looking at a cross sectional view of the middle of the fairing 18 in the line of flight direction (as in FIG. 7), as the fairing 18 extends from the front portion 20 to the rear portion 24 it first traces a convex path until it reaches a point of inflection 21 and then traces a concave path until it reaches the trailing edge 26. This point of inflection 21 towards the rear of the fairing creates a concave surface and results in the fairing 18 becoming a lift creating aerodynamic surface. The point of inflection 21 is located around the 100%, 90%, 80%, 70%, or 60% of the chord length of the wing 10, taken in a line of flight direction and moving from the leading edge (0%) to trailing edge (100%) of the wing. In certain embodiments, when the fairing extends far enough beyond the trailing edge of the wing 10, the point of inflection 21 may be located around 110%, 120% or more of the chord length of the wing. The exact location of the point of inflection 21 may depend on the particular wing and hinge configuration, and be determined experimentally, by testing how the variation in location affects the lift loss experienced as a result of introduction of the fairing 18. FIG. 10 shows a three-dimensional representation of the fairing (similar to FIG. 3) with the point of inflection 21 clearly indicated with a line showing how the surface changes direction.

Figure 8:
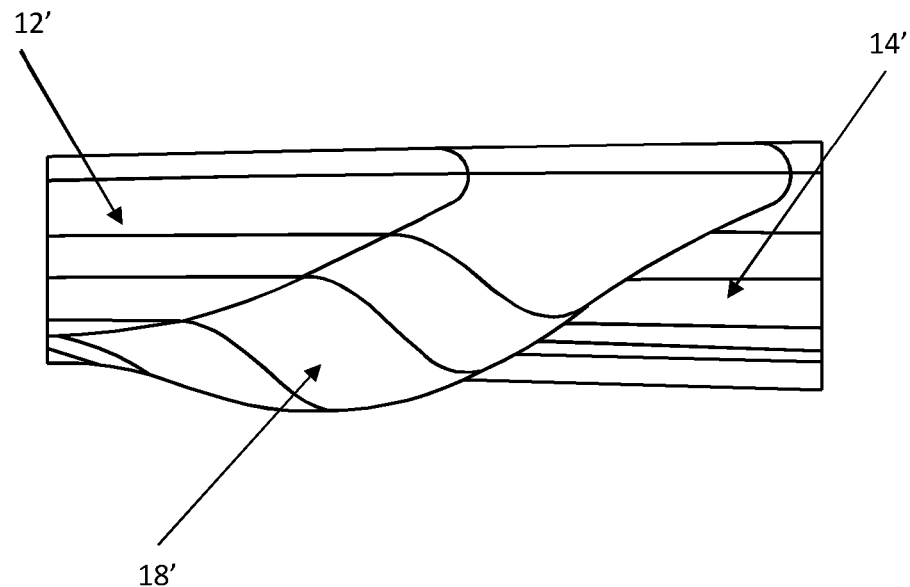
FIG. 8 is a schematic view of a fairing on a wing according to a second embodiment of the invention.
Figure 9:
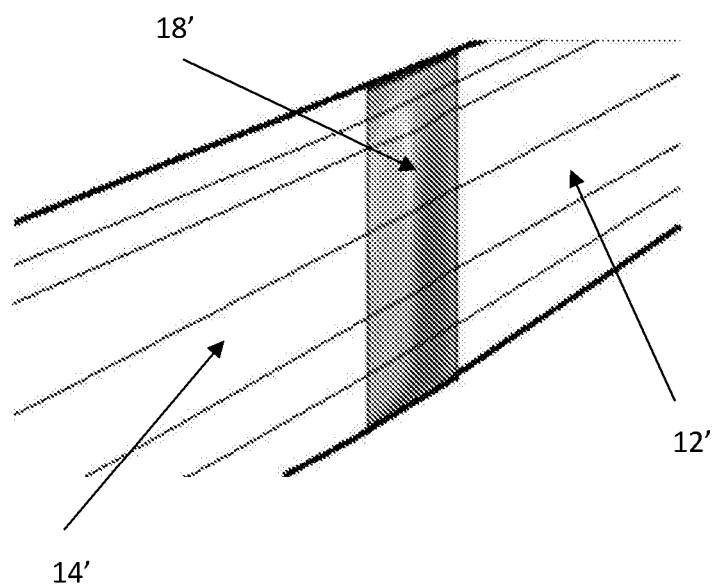
FIG. 9 is a plan view of the underside of the wing shown in FIG. 8.

FIGS. 8 and 9 show a similar fairing and wing arrangement to that shown in FIGS. 3 to 7, and 10. A wing tip device 12' and a fixed wing 14' are joined by a hinge (not shown) and a fairing 18' covers the hinge where it protrudes from the OML of the wing. The front portion of the fairing 18' is the same shape as in the first embodiment described. The rear portion of the fairing 18' is the same shape as in the first embodiment described, in that the rear portion comprises a surface which creates a concave surface. However, the fairing 18' does not extend beyond the trailing edge of the wing 10'. Such an arrangement may be possible when the protrusion of the hinge joining the fixed wing 14' and the wing tip device 12' is reduced either in depth or in the line of flight direction.

Figure 11:
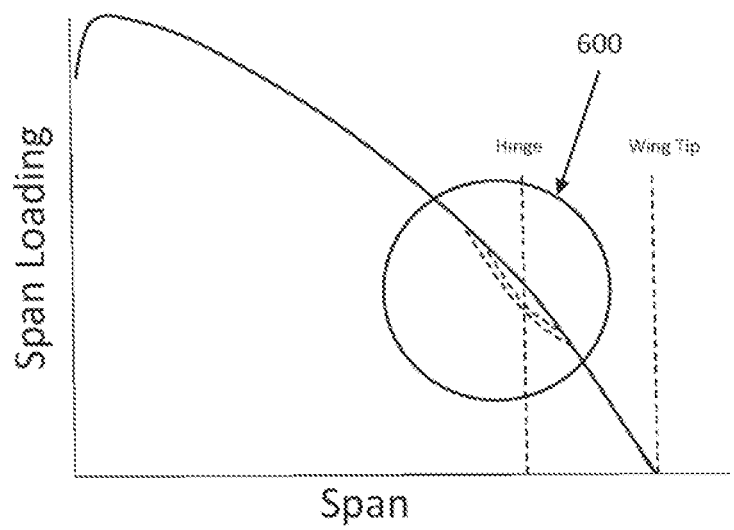
FIG. 11 is a graph showing the aerodynamic portion of a wing with alternative fairings including a fairing according to the invention.
Figure 12:
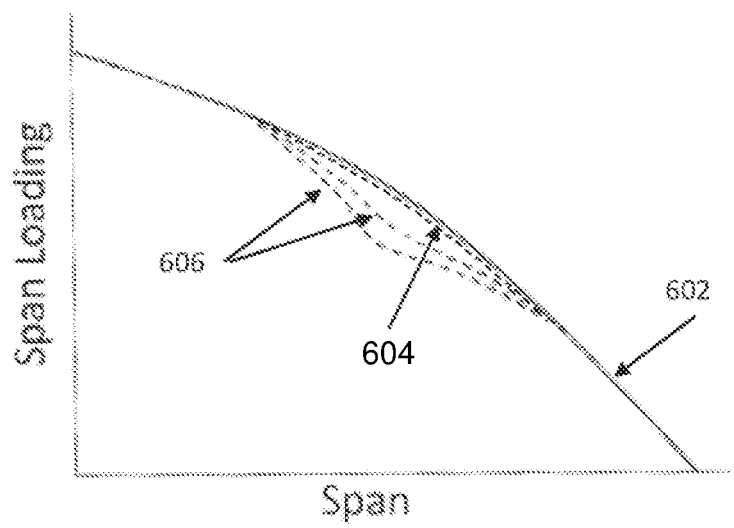
FIG. 12 is an enlarged section of the graph shown in FIG. 11.

FIG. 11 shows a schematic representation of a graph showing the lift characteristics of a wing as it extends in a span-wise direction. The hinge line and the wing tip are indicated on the span axis of the graph. FIG. 12 shows an expanded section 600 of the graph shown in FIG. 11. It can be seen that conventional fairings, as indicated by the lines 606, for example blister shaped fairings, result in lift loss in the part of the wing to which they are attached. However, the blended fairing, as described above, is lift-neutral when compared to a fixed wing with no wing tip device and associated fairing. The lift characteristics of a wing without a fairing is shown by line 602 and the lift characteristics of the wing according to an embodiment of the invention is shown by line 604. Therefore, it can be seen the present invention offers significant advantages of the existing fairing designs.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

Moreover, it is to be understood that such optional integers or features, whilst of possible benefit in some embodiments of the invention, may not be desirable, and may therefore be absent, in other embodiments.

The invention claimed is:

1. An aircraft comprising an aircraft wing, the aircraft wing comprising a fixed wing and a wing tip device at the tip thereof, wherein the wing tip device is configurable between: (i) a flight configuration for use during flight and (ii) a ground configuration for use during ground-based operations, in which ground configuration the wing tip device is moved away from the flight configuration such that the span of the aircraft wing is reduced, the aircraft wing further comprising
a hinge arrangement connecting the fixed wing and the wing tip device,
wherein the hinge arrangement protrudes beyond an outer surface of the fixed wing and wing tip device, and
a fairing covering the protruding portion of the hinge,
wherein the fairing comprises a rear portion with a concave surface, the concave surface creating a lift-generating portion of the fairing during flight, and
wherein the fairing is located only on a lower surface of the aircraft wing.

2. An aircraft as claimed in claim 1, wherein the rear portion extends beyond the trailing edge of the fixed wing and wing tip device.

3. An aircraft as claimed in claim 1, wherein the rear portion of the fairing comprises a trailing edge which is parallel in direction to the trailing edge of the fixed wing and/or wing tip device.

4. An aircraft as claimed in claim 1, wherein the rear portion tapers in span-wise width as it extends away from the trailing edge of the fixed wing and wing tip device.

5. An aircraft as claimed in claim 1, wherein the rear portion comprises a point of inflection in the line of flight direction, at which point the cross-sectional profile of the rear portion changes from a convex profile to a concave profile, as the rear portion extends in a rearward direction.

6. An aircraft as claimed in claim 5, wherein the point of inflection is located in a region between 100% to 60% of the chord length of the wing, taken in a line of flight direction and moving from the leading edge (0%) to trailing edge (100%) of the wing.

7. An aircraft as claimed in claim 1, wherein as the fairing extends in a span-wise direction, the rear portion of the fairing comprises a surface which extends tangentially from the wing skin of the fixed wing in a concave direction, undergoes a point of inflection to extend in a convex direction, and undergoes a further point of inflection such that it extends in a concave direction to a point where it is tangential to the wing skin of the wing tip device.

8. An aircraft as claimed in claim 1, wherein the fairing comprises a front portion blended into and extending rearwardly from the leading edge of the fixed wing and the wing tip device when the wing tip device is in the flight configuration.

9. An aircraft as claimed in claim 8, wherein the front portion of the fairing meets the leading edge of the fixed wing and wing tip device in a tangential direction.

10. An aircraft as claimed in claim 8, wherein the front portion of the fairing meets the leading edge of the fixed wing and wing tip device, such that when viewed in a line of flight cross-section, there is no discontinuity between the fairing and the leading edge of the fixed wing and wing tip device.

11. An aircraft as claimed in claim 8, wherein as the fairing extends in a span-wise direction across the wing, the fairing comprises a concave surface extending from the wing skin of the fixed wing, the concave surface starting in a direction tangential to the wing skin, a point of inflection in a span-wise direction, at which point the surface becomes a convex surface, such that the convex surface extends over maximum protrusion of the hinge arrangement, an additional point of inflection, at which point the surface becomes a concave surface, such that the concave surface meets the wing tip device wing skin in a tangential direction.

12. An aircraft as claimed in claim 1, wherein the fairing is symmetrical about a line of flight axis, the axis located at the point of greatest depth of the fairing.

13. An aircraft as claimed in claim 1, wherein the edges of the fairing, where the fairing blends into the fixed wing or wing tip device, the edges extend in a line of flight direction.

14. An aircraft as claimed in claim 1, wherein the fairing comprises a consistent span-wise width across at least 70% of the fairing.

15. An aircraft as claimed in claim 1, wherein the hinge arrangement extends in a line of flight direction.

16. An aircraft as claimed in claim 15, wherein the hinge arrangement extends in a line of flight direction such that it extends over at least 60% of the aircraft wing in a line flight direction.

17. An aircraft wing comprising a fixed wing and a wing tip device at the tip thereof, wherein the wing tip device is configurable between: (i) a flight configuration for use during flight and (ii) a ground configuration for use during ground-based operations, in which ground configuration the wing tip device is moved away from the flight configuration such that the span of the aircraft wing is reduced, the aircraft wing further comprising
a hinge arrangement connecting the fixed wing and the wing tip device,
wherein the hinge arrangement protrudes beyond an outer surface of the fixed wing and wing tip device, and a fairing covering the protruding portion of the hinge,
wherein in the flight configuration the fairing comprises a rear portion with a concave surface, the surface creating a lift-generating portion of the fairing during flight, and
wherein the fairing is located only on a lower surface of the aircraft wing.

18. An aircraft comprising an aerodynamic structure, a protruding structure and a fairing covering the protruding structure, wherein the fairing is blended into the aerodynamic structure in a line of flight direction and in a span-wise direction, wherein the fairing is located only on a lower surface of the aircraft wing, such that there are no discontinuities at the transition between the surface of the aerodynamic structure and the fairing.

19. An aircraft comprising an aerodynamic structure according to claim 18, wherein the fairing meets the surface of the aerodynamic structure along an interface, and wherein the fairing is shaped such that the surface of the fairing is tangential to the surface of the aerodynamic structure along the interface.

20. A fairing for an aircraft, the fairing comprising an interface surface for interfacing with the aircraft in a tangential direction, and an aerodynamic surface, the fairing further comprising a seamless transition from the interface surface to the aerodynamic surface, and wherein the fairing is located only on a lower surface of the aircraft wing.

21. A fairing as claimed in claim 20, the fairing comprising a longitudinal axis corresponding to the line of flight direction when mounted on an aircraft, wherein the cross-sectional profile of the fairing taken perpendicular to the longitudinal axis comprises a bell-shaped curve.

22. A fairing as claimed in claim 21, wherein the aerodynamic surface comprises a concave surface.

\* \* \* \* \*